March 4, 1924.
W. M. MOONEY
INSECT TRAP
Filed Nov. 20, 1922
1,485,867
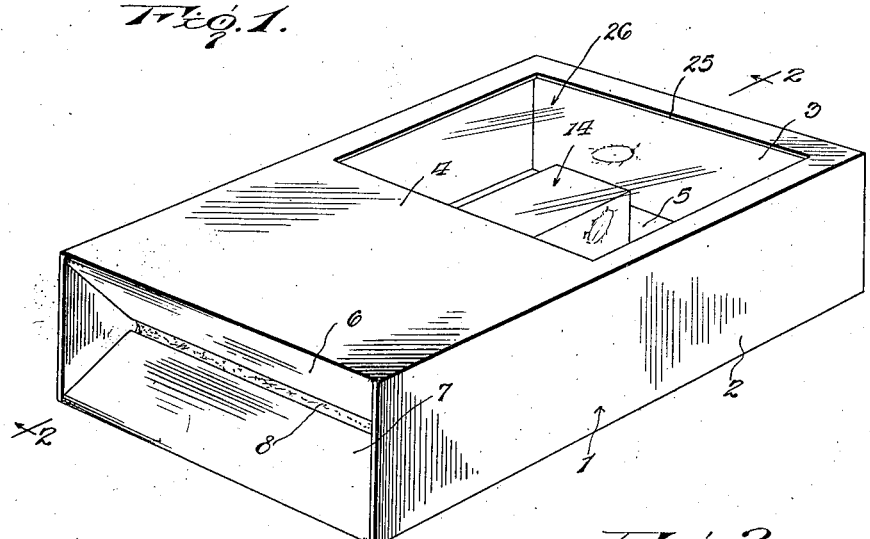
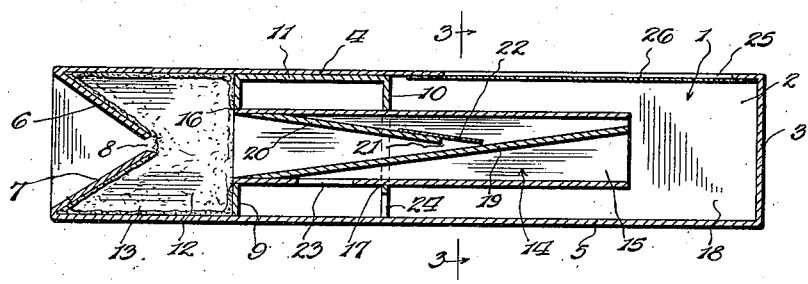
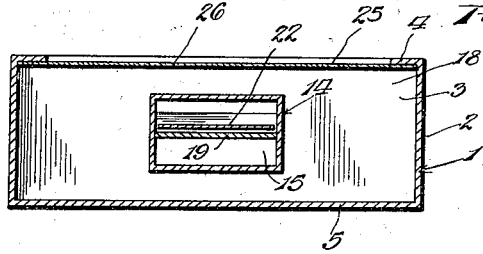
Inventor
William M. Mooney.
By Lacy & Lacy, Attorneys Patented Mar. 4, 1924.

1,485,867

UNITED STATES PATENT OFFICE.

WILLIAM M. MOONEY, OF WASHINGTON, DISTRICT OF COLUMBIA, ASSIGNOR OF ONE-HALF TO HERBERT F. GROVES, OF WASHINGTON, DISTRICT OF COLUMBIA.

INSECT TRAP.

Application filed November 20, 1922. Serial No. 602,186.

*To all whom it may concern:*

Be it known that I, WILLIAM M. MOONEY, a citizen of the United States, residing at Washington, in the District of Columbia, have invented certain new and useful Improvements in Insect Traps, of which the following is a specification.

This invention relates to insect traps and more particularly to a trap for roaches, water bugs and other crawling insects, and the general object of the invention is to provide a trap which may be employed with great effectiveness in trapping such insects and which will possess various advantages rendering it more desirable than such traps as ordinarily constructed.

One difficulty attending the use of traps such as mentioned above resides in the inconvenience experienced in disposing of the insects after they have been trapped, it being ordinarily difficult to dispose of them without likelihood of their escaping at the time they are discharged from the trap. Therefore, the present invention contemplates an insect trap which might be so cheaply manufactured that after it has served its purpose, it may be destroyed, together with the insects therein, without any inconvenience and without any likelihood of the insects escaping. More specifically, the invention contemplates constructing the trap of paper, paste board or similar inexpensive material which may be burned, so that after a number of insects have been caught in the trap, the entire trap may be burned in the stove and it and the insects thus destroyed.

Another object of the invention is to so construct the trap as to preclude any possibility of the insects escaping from the trap after they have once entered.

Another object of the invention is to so construct the trap that one may observe, at a glance, the number of insects which have been caught in the trap, and this without the necessity of opening any portion of the trap or affording any opportunity for the insects to escape.

Another object of the invention is to provide novel means for attracting the insects to the trap and inducing them to enter the same.

In the accompanying drawings:

Figure 1 is a perspective view of the trap embodying the invention;

Figure 2 is a vertical longitudinal sectional view therethrough on the line 2—2 of Figure 1;

Figure 3 is a vertical transverse sectional view on the line 3—3 of Figure 2.

The trap embodying the invention is formed, almost in its entirety, from paste board or heavy paper and comprises a hollow rectangular body which is indicated in general by the numeral 1 and which includes side walls 2, an end wall 3, a top 4, and a bottom 5, the other end of the body being practically open except that at this end the top and bottom walls 4 and 5 are formed with flaps or extensions 6 and 7, respectively, which are extended inwardly from the end edges of the said walls at an angle of inclination and with their free edges suitably spaced to provide an entrance passageway 8 through which the insects may enter when they crawl upwardly over the flap 7.

Parallel partition walls 9 and 10 divide the interior of the body transversely and are preferably provided by making two parallel folds in a piece of paste board thus forming the two partition walls and an integral connecting portion which is indicated by the numeral 11 and which may be secured by adhesive or otherwise to the under side of the top 4 of the said body, the lower edges of the walls 9 and 10 resting upon the upper side of the bottom 5 of the body. The wall 9 is spaced inwardly a suitable distance from the entrance passageway 8 and provides between it and the flaps 6 and 7, a bait compartment which is indicated by the numeral 12 and the walls of which have applied to them a coating 13 of any suitable plastic bait which will serve to attract the insects and induce them to enter the trap.

The numeral 14 indicates in general a runway which is arranged within the body of the trap and which comprises a preferably rectangular tube 15 of heavy paper or paste board, this tube being fitted at one end into an opening 16 in the partition 9 and extending also through an opening 17 in the partition 10, it being understood that the tube is in this manner firmly supported. The said end of the tube is presented toward the entrance passageway 8 and opens directly into the bait compartment 12, and the other end of the tube extends into the trapping compartment of the device which is indicated by the numeral 18 and which is bounded by the side walls 2, top and bottom walls 4 and 5, end wall 3, and partition wall 10. Arranged within the tubular runway 14 is a false bottom 19 which is inclined upwardly from the entrance end of the runway to the exit end thereof, being, however, spaced at its last-mentioned end from the top of the tube 15 a sufficient distance to permit the insects to pass into the trapping compartment 18 through the said exit end of the tube 15. A baffle wall 20 is arranged transversely within the tube 15 and extends from the top of the tube at the entrance end thereof downwardly and rearwardly and terminates short of the plane occupied by the false bottom 19, thus leaving a space 21 between the end of the baffle and the false bottom 19 through which the insects may pass as they crawl up the said false bottom. In order to prevent return of the insects through the runway without, however, impeding the passage of the insects through the runway into the trapping compartment, a flap 22 of relatively thin paper, tinfoil, or any other material found suitable for the purpose, is secured to the upper side of the baffle 20 and projects somewhat beyond the end edge of the said baffle and nearly in contact with the upper surface of the inclined false bottom 19. The bottom of the tube 15 is formed with an opening 23, located between the partitions 9 and 10, and the said partition 10 is formed with an opening 24 in its portion below the tube 15.

In order that one may readily ascertain the number of insects caught in the trap, the top wall 4 of the body of the trap is formed with an opening 25 in its portion which extends over the trapping compartment 18, and a pane of some transparent or substantially transparent material, such, for example, as celluloid, mica, or oiled paper, is arranged within the opening.

From the foregoing description of the invention it will be understood that the insects will first enter the bait compartment 12, being attracted thereto by the bait, and after entering this compartment will be influenced to pass longitudinally through the runway 14, crawling upwardly along the false bottom 19 thereof and beneath the baffle 20, passing likewise under the flap 22 and finally entering the trap compartment 18. Should the insects, after passing beneath the flap 22, attempt to escape, they will be prevented from doing so by reason of the presence of the said flap 22. Should they attempt to leave the trap by entering the exit end of the runway tube, they will eventually meet with the opening 23 and will crawl through the same and into the space between the partition walls 9 and 10, from which space they may pass through the opening 24 back into the trapping compartment. After a number of insects have been trapped, they, together with the trap, may be disposed of by simply burning the trap and the trapped insects in a stove or furnace.

Having thus described the invention, what is claimed as new is:

1. In an insect trap, a hollow body having an entrance passageway in one end, a partition dividing the body interiorly into bait and trapping compartments, and a runway leading through the partition and establishing communication between the said compartments, and a baffle wall within the runway having a flexible portion located in relatively close proximity to the bottom of the runway.

2. In an insect trap, a hollow body having an entrance passageway in one end, a partition dividing the body interiorly into bait and trapping compartments, and a tubular runway leading through the partition and establishing communication between said compartments and having one end presented toward the entrance passageway, the runway having a bottom inclined from its entrance to its exit end and at its last-mentioned end located relatively close to the top of the runway whereby to restrict the exit.

3. In an insect trap, a hollow body having an entrance passageway in one end, a partition dividing the body interiorly into bait and trapping compartments, a tubular runway leading through the partition and establishing communication between said compartments and having one end presented toward the entrance passageway, the runway having a bottom inclined from its entrance to its exit end and at its last-mentioned end located relatively close to the top of the runway whereby to restrict the exit, and a baffle wall within the runway inclined downwardly from the entrance end of the runway toward the said bottom and to a point relatively close thereto.

4. In an insect trap, a hollow body having an entrance passageway in one end, a partition dividing the body interiorly into bait and trapping compartments, a tubular runway leading through the partition and establishing communication between said compartments and having one end presented toward the entrance passageway, the runway having a bottom inclined from its entrance to its exit end and at its last-mentioned end located relatively close to the top of the runway whereby to restrict the exit, and a baffle wall within the runway inclined downwardly from the entrance end thereof and provided with a flexible flap extension extending relatively close to the said bottom of the runway.

5. In an insect trap, a hollow body having an entrance passageway in one end, a partition dividing the body interiorly into bait and trapping compartments, a runway leading through the partition and establishing communication between the said compartments, and a coating of bait upon the inner surface of the wall of the bait compartment.

6. In an insect trap, a hollow body having an entrance passageway in one end, a partition dividing the body interiorly into bait and trapping compartments, means establishing communication between the compartments and inhibiting return passage from the trapping compartment into the bait compartment, and a coating of bait upon the inner surface of the wall of the bait compartment.

7. In an insect trap, a hollow body closed at its sides, top, bottom and one end, the said top and bottom of the body having flap extensions at the other end of the body extending into the interior of the body and relatively angularly disposed and spaced at their inner edges to provide an entrance passageway, a partition dividing the body interiorly into bait and trapping compartments, into the former of which the said passageway opens, and means establishing communication between the said compartments and inhibiting return passage of the insects from the trapping compartment into the bait compartment.

8. In an insect trap, a hollow body having an entrance passageway in one end, a partition dividing the body interiorly into bait and trapping compartments, a tubular runway leading through the partition and establishing communication between the said compartments, a false bottom within the runway inclined upwardly from the entrance end to the exit end thereof, and a baffle within the runway inhibiting the return passage of the insects therethrough, the true bottom of the runway having an opening beneath the forward portion of the false bottom thereof.

9. In an insect trap, a hollow body having an entrance passageway in one end, means dividing the body interiorly into bait and trapping compartments and comprising a folded blank providing spaced partition walls and a connecting wall extending between them and secured to one wall of the said body, the said partition walls having oppositely located openings, and a tubular runway mounted at one end portion in the openings in the said partitions and establishing communication between the compartments.

In testimony whereof I affix my signature.

WILLIAM M. MOONEY. [L. S.]